US006531518B1

(12) United States Patent
Lapidus et al.

(10) Patent No.: US 6,531,518 B1
(45) Date of Patent: Mar. 11, 2003

(54) FISCHER-TROPSCH CATALYST ENHANCEMENT

(75) Inventors: Albert L'Vovich Lapidus; Alla Jurievna Krylova; Lilia Vadimovna Sineva, all of Moscow (RU); Russell John Koveal; Michel A. Daage, both of Baton Rouge, LA (US)

(73) Assignee: ExxonMobil Research and Engineering Co., Annandale, NJ (US)

( * ) Notice: Subject to any disclaimer, the term of this patent is extended or adjusted under 35 U.S.C. 154(b) by 0 days.

(21) Appl. No.: 09/653,915

(22) Filed: Sep. 1, 2000

(51) Int. Cl.⁷ .................... C07C 27/00; B01J 29/04; B01J 31/00; B01J 23/00
(52) U.S. Cl. .................. 518/709; 518/714; 502/85; 502/104; 502/107; 502/111; 502/115; 502/303; 502/305
(58) Field of Search ................. 518/709, 714; 502/104, 107, 111, 115, 85, 303, 305

(56) References Cited

U.S. PATENT DOCUMENTS

| | | |
|---|---|---|
| 2,583,619 A | 1/1952 | White |
| 3,661,798 A | 5/1972 | Cosyns et al. |
| 4,089,812 A | 5/1978 | O'Hare et al. |
| 4,399,234 A | 8/1983 | Beuther et al. |
| 4,492,774 A | 1/1985 | Kibby et al. |
| 4,585,798 A | 4/1986 | Beuther et al. |
| 4,670,414 A | 6/1987 | Kobylinski et al. |
| 4,826,799 A | 5/1989 | Cheng et al. |
| 4,895,994 A | 1/1990 | Cheng et al. |
| 4,910,175 A | 3/1990 | Michel et al. |
| 4,977,126 A | 12/1990 | Mauldin et al. |
| 5,168,091 A | 12/1992 | Behrmann et al. |
| 5,260,239 A | 11/1993 | Hsia |
| 5,268,344 A | 12/1993 | Pedrick et al. |
| 5,283,216 A | 2/1994 | Mitchell |
| 5,292,705 A | 3/1994 | Mitchell |
| 5,348,982 A | 9/1994 | Herbolzheimer et al. |
| 5,382,748 A | 1/1995 | Behrmann et al. |
| 5,536,694 A | * 7/1996 | Schuetz et al. ............. 502/301 |

FOREIGN PATENT DOCUMENTS

| | | | |
|---|---|---|---|
| EP | 0253924 | * | 7/1986 |
| GB | 1038256 | * | 5/1965 |

OTHER PUBLICATIONS

Suslick et al., *Nature*, vol. 353, pp. 414–416, (1991).
Gibson et al., *Science*, vol. 267, pp. 1338–1340 (1995).
Potoczna–Petru et al., *Applied Catalysts A*, General pages 113–120 (1998).

* cited by examiner

*Primary Examiner*—Jafar Parsa
(74) *Attorney, Agent, or Firm*—Jay Simon

(57) ABSTRACT

A process of enhancing both the activity and the methane selectivity of a particulate Dispersed Active Metal ("DAM") hydrogenation catalyst is disclosed wherein the DAM undergoes low temperature oxidation in a slurry phase to form a stable, unique oxidized catalyst precursor that is subsequently reduced to form an enhanced catalyst by treatment with hydrogen-containing gas at elevated temperature, wherein one or more promoter metal oxides of chromium, lanthanum and manganese are added to the DAM. Precursors of the promoter metal oxides may be combined with the DAMs prior to or during formation of the initial slurry, during the oxidation step or between recovery of the oxidized catalyst precursor and treatment of it with hydrogen-containing gas to reactivate the catalyst. Conversion of the precursors to the promoter metal oxides is carried out prior to the treatment with hydrogen-containing gas unless said treatment itself produces the conversion.

15 Claims, No Drawings

FISCHER-TROPSCH CATALYST ENHANCEMENT

This invention relates to a process for the activation of dispersed active metal catalysts that enhances their activity and selectivity in the production of higher hydrocarbons from synthesis gas.

BACKGROUND OF THE INVENTION

The production of higher hydrocarbon materials from synthesis gas, i.e. carbon monoxide and hydrogen, commonly known as the Fischer-Tropsch ("F-T") process, has been in commercial use for many years. Such processes rely on specialized catalysts. The original catalysts for the Fischer-Tropsch synthesis were nickel. Nickel is still the preferred catalyst for hydrogenation of fats and specialty chemicals. Over the years, other metals, particularly iron and cobalt, have been preferred in the Fischer-Tropsch synthesis of higher hydrocarbons whereas copper has been the catalyst of choice for alcohol synthesis. Cobalt is particularly preferred for Fischer-Tropsch synthesis due its high productivity and comparatively low methane selectivity. As the technology of these syntheses developed over the years, the catalysts became more refined and were augmented by other metals and/or metal oxides that function to promote their catalytic activity. These promoter metals include the Group VIII metals, such as platinum, palladium, rhenium, ruthenium and iridium. Metal oxide promoters include the oxides of a broader range of metals, such as molybdenum, tungsten, zirconium, magnesium, manganese and titanium. Those of ordinary skill in the art will appreciate that the choice of a particular metal or alloy for fabricating a catalyst to be utilized in Fischer-Tropsch synthesis will depend in large measure on the desired product or products.

Particularly suited for the production of hydrocarbons by Fischer-Tropsch synthesis from synthesis gas are Dispersed Active Metals ("DAM") which are primarily, i.e. at least about 50 wt. %, prefer ably at least 80 Wt. %, composed of one or a mixture of metals such as described above and are, without further treatment, capable of catalyzing Fischer-Tropsch synthesis. DAM catalysts may be prepared by any of a number of art-recognized processes.

In 1924, M. Raney prepared a nickel hydrogenation catalyst by a process known today as the Raney Process. For purposes of simplicity, the term "Raney" will be utilized herein as a generic term to describe the process, alloys and catalysts obtained thereby. This specific synthesis, in essence, comprises forming at least a binary alloy of metals, at least one of which can be extracted, and extracting it thereby leaving a porous residue of the non-soluble metal or metals that possesses catalytic activity. The residue, or non-extractable, catalyst metals are well known to those skilled in the art and include Ni, Co, Cu, Fe and the Group VIII noble metals. Likewise, the leachable or soluble metal group is well known and includes aluminum, zinc, titanium and silicon, typically aluminum. Once alloys are formed of at least one member of each of these groups of metals, they are ground to a fine powder and treated with strong caustic, such as sodium hydroxide, to leach the soluble metal.

There exist many variations of the basic preparation of Raney catalysts such as, for example, deposition of alloys onto a performed support by flame spraying, (U.S. Pat. No. 4,089,812), formation of the alloy by surface diffusion of aluminum on a non-leachable metal substrate (U.S. Pat. No. 2,583,619), and forming pellets from the powdered alloys for use in fixed bed reactions vessels (U.S. Pat. Nos. 4,826,799, 4,895,994 and 5,536,694). These developments have made possible the use of shaped Raney catalysts in fixed bed reaction vessels.

A preferred reactor carrying out for Fischer-Tropsch reactions utilizing DAM catalysts is the slurry bubble column developed by Exxon Research & Engineering Company. This reactor, which is ideally suited for carrying out highly exothermic, three-phase catalytic reactions, is described in U.S. Pat. No. 5,348,982. In such reactors, the solid phase catalyst is dispersed or held in suspension in a liquid phase by a gas phase that continuously bubbles through the liquid phase. The catalyst loading in slurry bubble reactors can vary within a broad range of concentrations, but must remain short of the so-termed "mud limit" where the concentration becomes so high that mixing and pumping of the slurry become so difficult that practical operation is no longer possible. The use of high metal-loading catalysts or bulk metal catalysts is preferred in slurry bubble reactors in order to maximize the productivity of both catalyst and reactor.

An extensive review of process of forming DAM catalysts can be found in "Active Metals", Edited by Alois Furstner, published by VCH Verlagsgesellschaft mbH, D-69451 Weinheim (FRG) in 1996 and the references cited therein. Methodologies described therein include the Reike method, the use of ultrasound, reduction of metal salts, colloids, nanoscale cluster and powders. Other relevant references include, for example, the preparation of amorphous iron catalyst by high intensity sonolysis of iron pentacarbonyl, Suslick et al., Nature, Vol. 353, pp 414–416 (1991) and the formation of single domain cobalt clusters by reduction of a cobalt salt with hydrazine, Gibson et el., Science, Vol. 267, pp 1338–1340, (1998). Finally, intermetallic alloys, particularly those known for forming metal hydrides, such as $LaCo_5$, can be formed into a fine powder by the application of hydrogen adsorption/desorption cycles. DAM catalysts can also be prepared by thermal or chemical decomposition of metal formates or oxalates. These methods are given as examples and are not intended in any way to limit the term "DAM" as utilized in the context of the present invention.

One of the primary characteristics of DAM catalysts is that, in their dry form, they are generally pyrophoric. For this reason, they are generally stored and shipped in airtight containers, typically as a slurry in an appropriate solvent, such as water or oil, or coated with a removable protective layer of an air-impervious material, such as wax. We are not aware of any DAM catalysts that are not used as they are formed, i.e. without any further treatment following extraction of the leachable metal and subsequent drying steps as described above. On the opposite end of the cycle, the manufacturers of DAMs recommend that spent catalysts, i.e. those no longer economically effective, must undergo deactivation in order that they may be safely disposed of. Such deactivation is generally achieved via oxidation of the metal by air oxidation or treatment with dilute bleach solution.

It will be appreciated that a means of enhancing the activity of the catalyst would greatly increase its value in the process. Another important aspect of the value of a catalyst is its selectivity which is the ratio of the percent of feed material converted to desired higher hydrocarbons to that of short chain hydrocarbons produced, primarily methane, commonly referred to as "methane selectivity". In copending patent application 09/635,718 there is disclosed and claimed a process called slurry low temperature oxidation whereby the activity and methane selectivity of a DAM catalyst are significantly enhanced. In accordance with the present invention, it has been found that a modification of the slurry low temperature oxidation further enhances the activity and methane selectivity of DAM catalysts.

SUMMARY OF THE INVENTION

In accordance with the present invention, Dispersed Active Metal ("DAM") Fischer-Tropsch catalysts are enhanced both in activity and methane selectivity by low temperature oxidative deactivation in a slurry phase to form an oxidized catalyst precursor comprising said metals and at least one of hydroxides thereof and oxides, which differs compositionally from that obtained by conventional high temperature oxidation utilizing an oxygen-containing gas. The activity and methane selectivity of the DAM catalyst is further enhanced by the addition of one or more of the oxides of chromium, lanthanum, or manganese, known os promoter metals for the catalytic activity of the DAMs. One or mores precursor of these promoter metal oxides is added to the DAM catalyst prior to, during or subsequent to the oxidation, and the mixture is treated to form the oxides therefrom. The active catalyst is then formed by reductive reactivation with hydrogen at elevated temperature.

DETAILED DESCRIPTION OF THE INVENTION

It is well known to those skilled in the art of Fischer-Tropsch synthesis chemistry that Group VIII metal surfaces exhibit higher activities for catalytic reactions such as hydrogenation, methanation and Fischer-Tropsch synthesis when subjected to a high temperature oxidation-reduction (O-R) cycle. Such "activation" techniques are reviewed in Applied Catalysis, A. General 175, pp 113–120 (1998) and citations therein. A series of patents, e.g. U.S. Pat. Nos. 4,492,774; 4,399,234; 4,585,789 and 4,670,414 disclose activation of a cobalt catalyst by a reduction/oxidation/reduction (R-O-R) cycle. So far as we are aware, all such oxidation/reduction and reduction/oxidation/reduction cycles described in the literature are effected by treating a solid catalyst with an oxygen-containing gas at high temperatures. This treatment results in the formation of the most stable oxide of the metal, i.e. in the instance of cobalt, $Co_3O_4$. All DAMs treated in accordance with the invention are characterized by the capacity to form more than one oxide. Heretofore, those practicing the process described above have sought to completely oxidize such DAMs to the highest oxidation state oxide, which corresponds to the most stable oxide.

In the activation treatments described above, the oxygen content of the treating gas in the oxidation step varies from as low as 15 ppm to pure oxygen and the temperatures typically are between about 200° C. to 600° C. Several publications dealing with these activation methodologies also stress the importance of controlling the exothermicity of the reaction to avoid sintering of the cobalt oxide particles since that may be detrimental to the activity of the final catalyst. We have found that this latter observation is even more critical with regard to the oxidation of DAM catalysts because of their high metal content, particularly those that may also contain active hydrogen species as in Raney catalysts or metal hydrides.

Significant enhancement in both the activity and methane selectivity for Fischer-Tropsch synthesis is realized by treating a DAM catalyst with an oxidation/reduction cycle wherein the oxidation is carried out in a slurry phase at low temperature. By low temperature is meant a temperature below 200° C., preferably below 100° C. The oxidation is effected by bubbling a gaseous oxidant through a slurry of the DAM catalyst, or by the slurry itself formed from or combined with an aqueous solution of a suitable oxidant. Typical conditions for the oxidative deactivation of a DAM catalyst utilizing an oxidative gas are as follows: ratio of liquid to DAM by volume—at least about 3:1, preferably at least about 5:1; temperature—from about 25° C. to 100° C., preferably from about 50° C. to 80° C.; total pressure—from about 15 to 300 psia, preferably from about 15 to 100 psia; contact time for the DAM in the slurry—at least one hour, preferably until the DAM has lost pyrophoricity; and gas flow rate—at least 100 cc/min. Typical oxidative gases in addition to oxygen include ozone and nitrogen oxides, i.e. nitrous oxide and nitric oxide all of which may be utilized in pure form, but typically are mixed with one or more inert diluent gases. Wherein oxygen is utilized. for example, typically air is caused to flow into the slurry. Alternatively, pure oxygen can be mixed with an inert gas in from about 1 to 50%, preferably from about 5 to 25% by volume.

Wherein the oxidative treatment is carried out utilizing a dilute solution of an oxidant, the oxidant is chosen so as not to introduce substances into the slurry that are recognized as being permanent poisons of the Fischer-Tropsch synthesis, e.g. ionic forms of chlorine, bromine, phosphorus and sulfur. Included within the scope of oxidants in solution are solutions of compounds that form oxidants in situ upon contact with air, for example, certain alcohols will form hydroperoxides upon contact with air. Preferred oxidants include nitric acid and inorganic nitrates, for example, ammonium nitrate, hydrogen peroxide, and art-recognoized organic peroxides or hydroperoxides. Those skilled in the art will appreciate that the concentration of individual oxidants will vary according to their oxidizing capacity. In general, the amount of the oxidant in the slurry and the duration of the oxidation are sufficient to insure oxidation to a point such that the resulting dry DAM material would not exhibit uncontrollable pyrophoric responses upon exposure to ambient air and moisture but not so great as to cause unwanted secondary reactions such as dissolution or extraction of the active metal ions in the catalyst.

The liquid utilized to form the slurry is preferably water, however, other organic solvents may be utilized provided that they do not introduce any known poison of the Fischer-Tropsch synthesis and that are non-reactive with the conditions of the oxidation treatment. Hydrocarbons, particularly those derived from the Fischer-Tropsch synthesis itself are appropriate and may be used with either an oxygen-containing gas or dilute solution of the oxidants named above that are soluble therein, such as the organic peroxides. Further, mixtures of water and organic solvents miscible therewith can be utilized as well. Mixtures of water with immiscible solvents can also be utilized in combination with suitable dispersing or emulsifying agents present to form a continuous phase, i.e. an emulsion. Other suitable liquids include dense fluids, for example, supercritical fluids such as liquid phase lights, i.e. C3–5 alkanes, cyclopentane and the like. Preferred mixed liquids include, without any intended limitation, water/lower alkanols, water/Fischer-Tropsch products, and water/alkanols/alkanes. Solutions of the precursors of the subject promoter metal oxides may be utilized in whole or in part to form the slurry as will be described below.

The oxidative treatment described herein may be carried out in any reactor apparatus suitable for slurry reactions including, with no limitation intended, fixed bed reactors, moving bed reactors, fluidized bed reactors, slurry reactors, bubbling bed reactors and the like. Irrespective of whether the slurry reactor is operated as a dispersed or slumped bed, the mixing conditions in the slurry will typically be somewhere between the theoretical limiting conditions of plug flow and complete back mixing.

The product of the low temperature oxidation treatment of a DAM catalyst as described above is a mixture of metallic and oxidic species. This is the result of the fact that the metals in the DAMs can exist in more than one oxidation state and, in the subject treatment, a significant portion of the active metal of the DAM is oxidized to a lower oxidation state. In contrast, the prior art high temperature oxidation treatments result in complete oxidation of the active metal to the highest, and most stable, oxidation state. For example, in the subject treatment, a significant portion of cobalt metal is oxidized to CoO and/or $Co(OH)_2$ rather than $Co_3O_4$, iron metal is oxidized to FeO and/or $Fe(OH)_2$ rather than $Fe_3O_4$. Additionally, when the slurry in which the treatment is effected contains water, hydroxides of the metals will be formed as part of the mixture referred to above. This mixture is in fact an oxidized catalyst precursor wherein, on a mole percent basis, not more than 50% of the active metal present is in the form of the oxide of the highest oxidation state, and the highest oxidation state of the metal in combination with the amount in the metallic state does not exceed 85% of the active metal present, the remainder being lower oxidation state oxides and/or hydroxides. Preferably, not more than 25% of the active metal present is in the form of the oxide of the highest oxidation state, and the highest oxidation state of the metal in combination with the amount in the metallic state does not exceed 60% of the active metal present, the remainder being lower oxidation state oxides and/or hydroxides.

The oxidative treatment is regarded as complete when the DAM no longer exhibits uncontrollable pyrophoricity. By not exhibiting uncontrollable pyrophoricity is meant that, upon filtering the DAM in air, the temperature should not rise above 200° C. The oxidized catalyst precursor is then processed to further enhance the properties thereof as described below. Optionally, if it is desired to complete the process of the present invention at another time or place, since the oxidized catalyst precursor is stable, it may be recovered and dried under vacuum or under an inert atmosphere at a temperature of from about 50° to 150° C. Preferably, the oxidized catalyst precursor is dried under air flow at a temperature above 100° C. for at least one hour.

We have found that the activity of a DAM catalyst, already enhanced by slurry low temperature oxidation as described above, can be further improved by the addition thereto of small amounts of certain metal oxides that are recognized by those of ordinary skill in the art as promoters for cobalt DAMs. It is considered unexpected that the promoter metal oxides utilized in the subject process enhance the desirable properties of the DAM catalyst particles because, of the group of metal oxides commonly recognized as promoters for DAM catalysts, only the oxides of chromium, lanthanum and manganese have been found to be beneficial. By this is meant that only those metal oxides added to the oxidized catalyst precursor as described herein have been found to improve at least one performance characteristic of the DAM catalyst.

In accordance with the present invention, one or more of the metal oxides is added to the DAM in an amount sufficient to provide, in total, from about 0.01 to about 20, preferably from about 0.1 to about 10 percent by weight of the desired metal oxide, based on the catalyst metal in the DAM, in the final enhanced catalyst. By precursor of the subject promoter metal oxides is meant a compound that will form the desired metal oxide in the oxidation step, a heating step carried out after the oxidation step is completed, or in the treatment with hydrogen at elevated temperatures. Precursors of the subject promoter metal oxides are utilized since the oxides themselves possess very poor solubility. Suitable precursors possess sufficient solubility in solvents that are suitable for forming the oxidative slurry, or are miscible with the fluids used to form the slurry, and that do not introduce any incompatibility or poisons into the final enhanced catalyst. As examples of precursors there can be mentioned salts, such as the nitrates, and organic salts or complexes, such as the acetates, carbonyls, chelates and the like. The nitrates are of particular advantage in the subject process in that they can form at least a part of the oxidizing agent for the oxidation step as described above. In this instance, the precursor would be added to the DAM catalyst prior to forming the slurry, or to the slurry after it was formed, or the solution of the precursor would constitute the fluid for the slurry. Wherein the precursor would be at least part of the oxidizing agent, the step of converting the precursor to the desired promoter metal oxide would be carried out simultaneously with the oxidation step.

The solution of the precursor of the subject metal oxides may be added to the DAM prior to formation of the slurry, to the slurry after it is formed, during the oxidation step itself, or subsequent to completion of the oxidation. In all instances, the resultant mixture of the oxidized catalyst precursor and promoter metal oxide precursor, or metal oxide where the precursor has been at least a part of the oxidizing agent, are recovered and dried. In the event that an oxidant was utilized in carrying out the slurry low temperature oxidation that results in an alkaline slurry, the oxidized catalyst precursor should be rinsed prior to combining it with the solution of the one or more precursors for the promoter metal oxides. Recovery of the mixture of the oxidized catalyst precursor and one or more precursors for the promoter metal oxides is generally by physical separation such as by filtering, decanting and the like. Drying may take place under vacuum or under an inert atmosphere at a temperature of from about 50° to 150° C. Preferably, the mixture is dried under air flow at a temperature above 100° C. for at least one hour.

The mixture is then treated to convert the promoter metal oxide precursor to the metal oxide and deposit it onto the oxidized catalyst precursor. In general, this entails heating the mixture to a temperature sufficiently high to cause decomposition or transformation of the precursor to the desired oxide. Typically, this temperature would be about 300° to 500° C., preferably about 400° C. Wherein the precursor gives off volatile compounds in connection with forming the oxide, such as the degradation of an organic salt or complex, the heating can be carried out under vacuum to promote removal of such products. The heating step is carried out for a time sufficient to ensure that the conversion to the oxide is complete. Those of ordinary skill in the art will appreciate that there are various techniques, such as the detection of a volatile by-product, that can serve as an indicator that this has taken place.

The oxidized catalyst precursor is then converted to the active catalyst by reduction with hydrogen-containing gas at temperatures of from about 200° C. to 600° C., preferably from about 300° C. to 450° C., most preferably from about 340° C. to 400° C. Hydrogen partial pressure during the reduction would range from about 1 to 100 atmospheres, preferably from about 1 to 40 atmospheres. In those instances where the precursor of the promoter metal oxide by the above-described reduction with hydrogen at elevated temperature, the conversion step and the reduction step are carried out simultaneously. Typical Fischer-Tropsch activities of DAM catalysts activated in accordance with the process of the present invention are at least 120%, more frequently at least 150% of that of the original DAM. By the same token, methane selectivity of the DAMs are reduced by the present process to below 80%, more frequently below 60% of the original DAM. As those of ordinary skill in the art are aware, methane selectivity is enhanced when the percentage is reduced, hence a reduction in methane selectivity is a significant improvement.

The catalysts formed from DAMs in accordance with the activation process of the invention are used in synthesis processes for the formation of higher hydrocarbons wherein liquid and gaseous products are formed by contacting a syngas comprising a mixture of hydrogen and carbon monoxide with shifting or non-shifting conditions, preferably the latter in which little or no water gas shift takes place. The process is carried out at temperatures of from about 160° C. to 260° C., pressures of from about 5 atm to about 100 atm, preferably from 10 to 40 atm, and gas space velocities of from about 300 V/Hr/V to about 20,000 V/Hr/V, preferably from about 1,000 V/Hr/V to about 15,000 V/Hr/V. The stoichiometric ratio of hydrogen to carbon monoxide is about 2.1:1 for the production of higher hydrocarbons. This ratio can vary from about 1:1 to 4:1, preferably from 1.5:1 to 2.5:1, more preferably from 1.8:1 to 2.2:1. These reaction conditions are well known to those skilled in the art and a particular set of reaction conditions can readily be determined from the parameters given herein. The reaction may be carried out in virtually any type of reactor, e.g. fixed bed, moving bed, fluidized bed and the like. The hydrocarbon-containing products formed in the process are essentially sulfur and nitrogen free.

The hydrocarbons produced in a process as described above are typically upgraded to more valuable products by subjecting all or a portion of the C5+ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLE 1
Treatment of Cobalt Catalyst by Slurry Low Temperature Oxidation

A slurry of about 1200 grams of commercial cobalt catalyst (Raney® 2700) in water was placed in a 4 liter beaker and stirred with a Teflon®-coated stirring blade. A total of 1320 cc of 0.5N nitric acid solution was added to the slurry by slow addition. During the addition, the temperature of the slurry rose to about 60° C. and a strong ammonia odor developed. The slurry was stirred for an additional hour following completion of the addition. During the oxidation of the catalyst, the pH of the slurry became basic due to the reduction of the nitrate ions to ammonium ions. The total amount of nitrate ions added was adjusted in order to achieve a complete consumption of the hydrogen dissolved in the catalyst and the native hydrogen generated by the acidic oxidation of the metal in the catalyst. Further addition of nitric acid would result in a dissolution of cobalt ions into the solution, evidenced by a pink coloration, which is undesirable. The deactivated catalyst was filtered, washed three times with deionized water recovered by filtration. During the filtration, the solids were again washed three times with deionized water. The solids were dried overnight in a vacuum oven at 60° C. The catalyst was further treated in flowing air at 120° C. to complete passivation. The passivated catalyst was stored as is without additional storage precautions, yield 946.6 grams of dried, enhanced Raney cobalt catalyst.

EXAMPLE 2
Preparation of Metal Oxide Promoted Raney Cobalt Catalyst

An appropriate quantity of the nitrate salt of the metal promoters to be tested to provide a three percent by weight of the metal oxide on 30.0 grams of passivated Raney cobalt catalyst was dissolved in 12 ml of distilled water. The resulting solution was added to 30.0 grams of the passivated catalyst prepared in Example 1 and stirred for 10 minutes. The material was then dried for 45 minutes on a steam bath and mixed with 30–40 ml of 3–4 mm sized quartz particles. The mixture was placed into a reactor. Air was passed through the reactor and it was heated to 400° C. and held for five hours. The mixture was removed from the reactor and the quartz particles and catalyst were separated by sieving.

EXAMPLE 3
Catalyst Reduction

Catalyst from Example 2 (20 ml) was mixed with 70 ml of 1–2 mm quartz particles. The mixture was place into a 25 mm ID quartz reactor. The mixture was held in place with a layer of about 10 ml of the 1–2 mm quartz particles at the bottom of the reactor. The catalyst/quartz mixture was placed into the reactor one layer at a time with the individual layers being about 0.5 to 0.7 cc thick, until the entire volume of catalyst plus quartz was in the reactor. Hydrogen was passed through the reactor at ambient temperature and pressure at a gas hourly space velocity (GHSV) of 100 hr$^{-1}$ for 15 minutes. Prior to being admitted to the reactor, the hydrogen was passed through a column of potassium hydroxide pellets to assure removal of impurities. The reactor temperature was increased to 400° C. over about 45 minutes, held for five hours, and allowed to return to ambient, all under flowing hydrogen. The hydrogen flow was then replaced with a 2:1 blend of hydrogen and carbon monoxide synthesis gas at 100 hr$^{-1}$ GHSV for 15 minutes at atmospheric pressure. The synthesis gas was also passed through KOH pellets prior to being admitted to the reactor. The valves were then closed to the reactor thereby storing the catalyst under the synthesis gas blend.

EXAMPLE 4

Catalyst Testing

The flow of synthesis gas was resumed into a reactor as in Example 3 and the reactor temperature increased from ambient to 140° C. over about 40 minutes and the held for five hours. The temperature was allowed to return to ambient under flowing synthesis gas and the catalyst stored as in Example 3. Testing was resumed the next day by repeating the procedure with the exception of raising the temperature 10° C. This procedure was repeated until the optimum operating temperature was determined. The optimum operating temperature was that where the yield of C5+ products was maximized by measuring the grams of C5+ products produced per standard cubic meter of synthesis gas blend fed into the reactor. A decline in the yield of C5+ products produced indicated that the previous temperature was the optimum operating temperature. Catalyst performance was determined by measuring the gas contraction, products gas composition by gas chromatography and C5+ liquid product yield. The C5+ products were recovered from the reactor effluent using two traps. The first trap was water-cooled and the second cooled with dry ice/acetone (−80° C.). The C5+ product in the first trap was weighed directly. The product in the second trap was warmed to room temperature to volatilize C4− components and then weighed. The combined weights from the two traps was the yield. The C5+ product form the optimum temperature was further analyzed to determine hydrocarbon type and carbon chain length distribution. At random intervals, the C5+ products from the non-optimum temperature tests were combined and analyzed. The results are shown in the Table. In the Table, the Schultz-Flory Alpha determination is an indication of the tendency of the synthesis to produce a higher molecular weight hydrocarbon product. Higher numbers are desirable. Methane yield, therefore, is the opposite, i.e. since higher molecular weight products are desirable, a lower methane yield and conversion are positive results. It will be seen by the Table that, among metal oxides recognized as promoters, only chromium, lanthanum and manganese unexpectedly produce an increase in at least one of the desirable parameters measured in the test.

TABLE

| Metal Oxide Promoter | Optimum Temp ° C. | CO Conversion % | CH4 | C5+ | CH4 | C5+ | Schultz-Flory Alpha |
|---|---|---|---|---|---|---|---|
| None | 180 | 88 | 11 | 139 | 6 | 84 | 0.85 |
| Cr2O3 | 170 | 75 | 8 | 152 | 4 | 93 | 0.87 |
| La2O3 | 180 | 72 | 9 | 146 | 5 | 92 | 0.85 |
| CeO2 | 180 | 73 | 12 | 136 | 6 | 84 | 0.85 |
| Mn2O3 | 180 | 66 | 7 | 133 | 4 | 92 | 0.89 |
| ZrO2 | 170 | 77 | 10 | 128 | 6 | 84 | 0.84 |
| TiO2 | 180 | 76 | 20 | 124 | 10 | 78 | 0.81 |
| ZnO | 190 | 68 | 20 | 98 | 13 | 74 | 0.82 |

What is claimed is:

1. A process for the formation of an enhanced dispersed active metal (DAM) catalyst for conducting hydrogenation reactions comprising:

a) forming a slurry in a suitable fluid of particulate DAM catalyst comprising metals characterized by the capacity to form more than one oxide;

b) contacting the particulate DAM catalyst in the slurry with an oxidizing agent at temperatures below 200° C. for a time such that the metals no longer exhibit uncontrollable pyrophoricity, thereby forming an oxidized catalyst precursor comprising said metals and at least one of hydroxides thereof and oxides thereof, wherein at least a portion of said hydroxides and oxides are in the lower oxidation state of the metals;

c) adding to said oxidized catalyst precursor a solution in a suitable solvent of one or more precursors of promoter metal oxides selected from the group consisting of chromium, lanthanum and manganese oxides;

d) recovering and drying said mixture of said oxidized catalyst precursor and said oxide precursor formed in step c); and e) treating said mixture to form said one or more promoter metal oxides from the precursor therefor; and f) forming an active catalyst from said oxidized catalyst precursor by treating the said mixture with hydrogen at elevated temperature.

2. A process in accordance with claim 1, wherein in step e) said mixture is heated to a temperature sufficient to decompose said one or more precursors to form said promoter metal oxides.

3. A process in accordance with claim 1, wherein heating of said mixture with hydrogen at elevated temperature forms said promoter metal oxides from the precursors therefor and said steps e) and f) are carried out simultaneously.

4. A process in accordance with claim 1, wherein said precursors of promoter metal oxides are nitrate salts that are added to said slurry in step a) and are reacted during the oxidization in step b) to form said promoter metal oxides and step b) and step e) are carried out simultaneously.

5. A process in accordance with claim 4, wherein the fluid utilized to form said slurry of the dispersed active metals is the solution of said one or more precursors of promoter metal oxides.

6. A process in accordance with claim 4, wherein the solution of said one or more precursors of promoter metal oxides is added to the slurry in step b).

7. A process in accordance with claim 1, wherein the gaseous oxidant contains a member selected from the group consisting of oxygen, ozone and nitrogen oxides.

8. A process in accordance with claim 1, wherein the fluid forming the slurry comprises water and the oxidized catalyst precursor includes hydroxides of the dispersed active metals.

9. A process in accordance with claim 1, wherein the oxidant is contained within the slurry fluid is selected from the group consisting of nitric acid, an inorganic nitrate and a peroxide.

10. A process in accordance with claim 9, wherein the oxidant is an inorganic nitrate and is at least partially provided by said precursors of promoter metal oxides wherein said precursors are nitrate salts and are added step a).

11. A process in accordance with claim 1, wherein step b) is carried out at a temperature below 100° C.

12. A process in accordance with claim 1, wherein the fluid forming the slurry is a mixture of hydrocarbons or a supercritical fluid.

13. A process in accordance with claim 1, wherein in step d) said precursor is dried under an inert atmosphere.

14. A process in accordance with claim 1, wherein in step d) said precursor is dried in air at a temperature above 100° C. for at least one hour.

15. A process in accordance with claim 1, wherein step e) is heating said mixture in air to a temperature of about 400° C. for a time sufficient to form the promoter metal oxide from said one or more precursors thereof.

* * * * *